(12) United States Patent
Uneta et al.

(10) Patent No.: US 6,523,631 B2
(45) Date of Patent: Feb. 25, 2003

(54) VEHICLE BODY FRAME STRUCTURE

(75) Inventors: Hisashi Uneta, Saitama (JP); Masami Yamasaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/796,439

(22) Filed: Mar. 2, 2001

(65) Prior Publication Data

US 2001/0023789 A1 Sep. 27, 2001

(30) Foreign Application Priority Data

Mar. 2, 2000 (JP) ........................................ 2000-057598

(51) Int. Cl.[7] ............................................... B62K 11/00
(52) U.S. Cl. ...................... 180/228; 180/291; 180/299; 180/312; 267/140.11
(58) Field of Search ................................. 180/218, 219, 180/228, 312, 291, 299; 267/41, 140.11

(56) References Cited

U.S. PATENT DOCUMENTS

| | | | | | |
|---|---|---|---|---|---|
| 3,730,509 | A | * | 5/1973 | Jorn | ............................ 267/152 |
| 4,261,105 | A | * | 4/1981 | Love | ...................... 123/198 E |
| 4,487,285 | A | * | 12/1984 | Tomita et al. | ............... 180/228 |
| 4,753,314 | A | * | 6/1988 | Tsukiji | ........................ 180/227 |
| 4,800,979 | A | * | 1/1989 | Tatsuji | ......................... 180/227 |
| 5,261,504 | A | * | 11/1993 | Katsura | ........................ 180/219 |
| 5,657,830 | A | * | 8/1997 | Kawashima et al. | ......... 180/220 |
| 5,876,013 | A | * | 3/1999 | Ott | .............................. 248/674 |
| 6,186,550 | B1 | * | 2/2001 | Horii et al. | .................. 280/833 |
| 2001/0045312 | A1 | * | 11/2001 | Adachi et al. | .............. 180/219 |

FOREIGN PATENT DOCUMENTS

| | | | | | |
|---|---|---|---|---|---|
| JP | 402246894 | A | * | 10/1990 | .................. 180/312 |
| JP | 407251783 | A | * | 10/1995 | |
| JP | A 111192 | | | 1/1999 | |
| JP | 11059551 | A | * | 3/1999 | ............ B62M/7/02 |
| JP | 2000168669 | A | * | 6/2000 | ............ B62M/7/04 |

* cited by examiner

Primary Examiner—Lesley D. Morris
Assistant Examiner—Daniel Yeagley
(74) Attorney, Agent, or Firm—Birch, Stewart, Kolasch & Birch, LLP

(57) ABSTRACT

To provide a vehicle body frame having a simple structure which can be flexible at the time of cornering. A cross pipe which connects a pair of left and right main frames in a traverse direction are provided. An arm portion is provided which extends from an intermediate portion of the cross pipe in the frontward direction and approximately horizontally. An upper engine hanger has one end thereof mounted on an extended end portion of the arm portion and the other end thereof extending downwardly and connected with a cylinder head portion of an engine.

14 Claims, 6 Drawing Sheets

VEHICLE BODY FRAME STRUCTURE

BACKGROUND OF THE INVENTION

1. Field of the Invention

The present invention relates to a body of a motorcycle, and more particularly to an engine hanger which provides a particularly flexible body.

2. Description of Background Art

Japanese Unexamined Patent Publication No. 11-1192 discloses a vehicle body frame which is constituted such that the vehicle body frame includes a pair of left and right main frames which in the front-back direction above an engine and a cross pipe which connects the main frames by bridging, and an upper engine hanger has one end thereof welded to the center of the cross pipe and the other end extending downwardly to support an upper portion of the engine. In this publication, the front-back direction, the up-down direction and the left-right direction are basically determined using the normal traveling state of a vehicle as the reference.

The vehicle body frame is not only required to simply increase its rigidity but also may be required to have the characteristics which allow the body to flexibly bend at the time of cornering or the like in accordance with specifications. However, in the above-mentioned conventional structure, since the engine also contributes to an increase in the rigidity of the vehicle body frame as a portion of the vehicle body frame, it has been difficult to provide flexibility to the vehicle body frame. Accordingly, it is an object of the present invention to provide the flexibility to the vehicle body frame while ensuring a relatively simple structure.

SUMMARY AND OBJECTS OF THE INVENTION

To solve the above-mentioned problems, a vehicle body frame structure according to the present invention includes a vehicle body frame for mounting an engine by utilizing an engine hanger. The vehicle body frame includes a pair of left and right main frames which extend in the front-back direction above said engine and a cross pipe which connects the main frames by bridging. An arm portion extends from the cross pipe approximately horizontally, and an upper engine hanger which is extended downwardly for supporting an upper portion of the engine is mounted on a tip end side of the arm portion.

According to the present invention, since the arm portion extends from the cross pipe and the upper engine hanger extends downwardly and is supported on the tip end side of the arm portion, this arm portion can be easily deflected at the time of cornering and hence, the flexibility can be given to the vehicle body frame. Further, since the provision is constituted simply by the addition of the arm portion, it becomes possible to provide flexibility to the vehicle body frame with a relatively simple structure.

The upper engine hanger includes an engine-side portion which extends downwardly from the vehicle body frame side and the arm portion includes a remaining portion of the vehicle body frame side which extends in an approximately horizontal direction and is connected to the cross pipe. Further, by adjusting the length of the arm portion, the flexibility can be desirably adjusted.

The upper engine hanger may be formed separately from or integrally with the arm portion. By forming the upper engine hanger separately from the arm portion, the rigidity can be adjusted for each portion. Further, it is expected that the upper engine hanger and the arm portion can be used among machines of different types thus enhancing the generality of the upper engine hanger and the arm portion. Further, by forming the upper engine hanger and the arm portion integrally, the number of parts can be reduced so that it becomes possible to make the structure simpler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
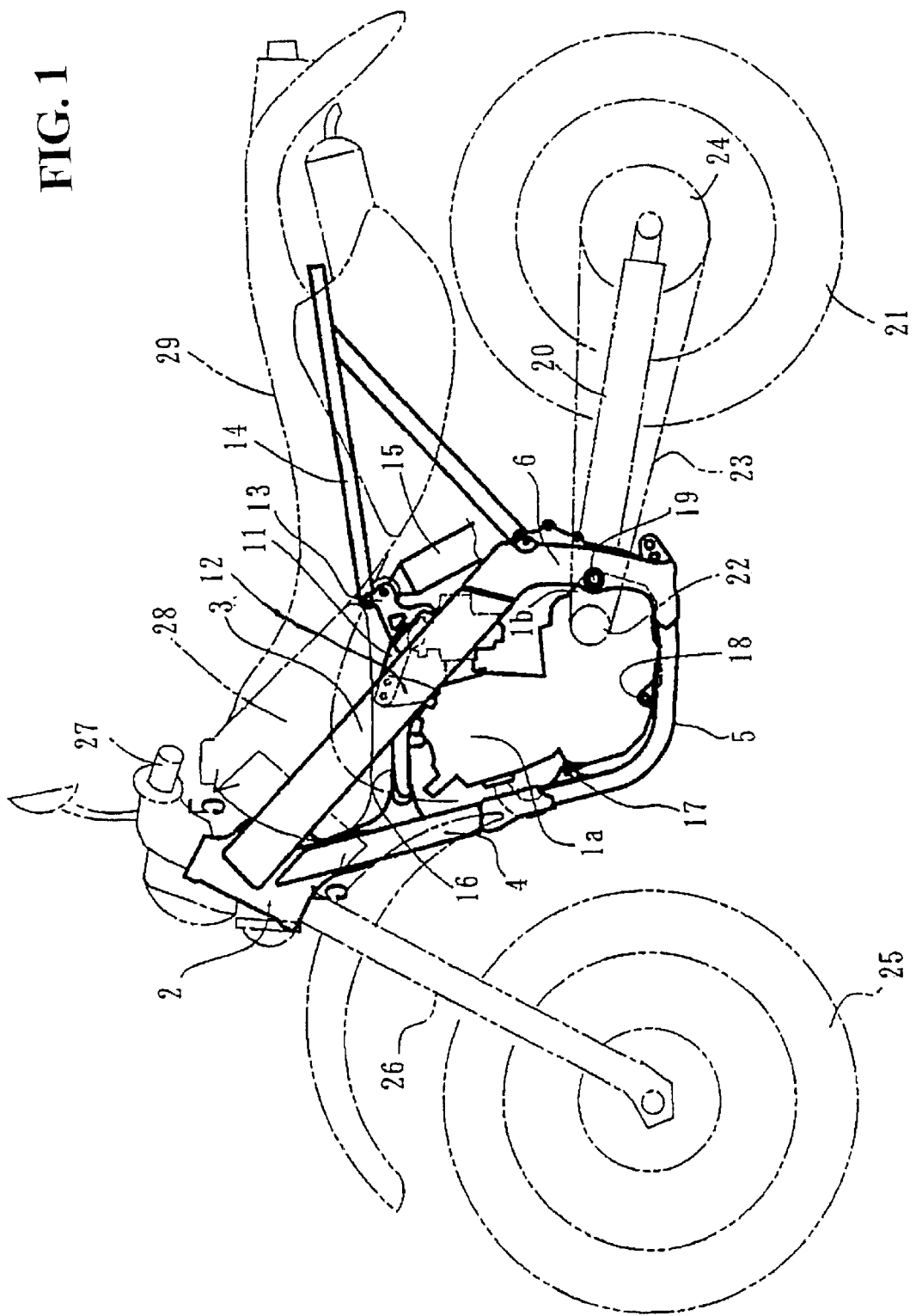
FIG. 1 is a side view of a vehicle body frame according to a first embodiment.

A first embodiment of a vehicle body frame applicable to an off-road type motorcycle is explained hereinafter in conjunction with drawings. In FIG. 1, the vehicle body frame is of a cradle type which supports an engine 1 in a loop shape. The vehicle body frame includes a pair of left and right main frames 3 which extend backwardly and downwardly in the front-back direction in an inclined manner above the engine 1 from a head pipe 2 which constitutes a supporting portion of a steering shaft. A front down tube 4 is provided that extends backwardly and downwardly in an inclined manner in front of the engine 1 along the center axis of the body from the head pipe 2. A pair of lower tubes 5 are bifurcated from a lower portion of the front down tube 4 in the left-right direction and extend in the front-back direction below the engine 1. A pair of left and right pivot plates 6 connect rear ends thereof with rear ends of the main frames 3 in the up-down direction.

Figure 2:
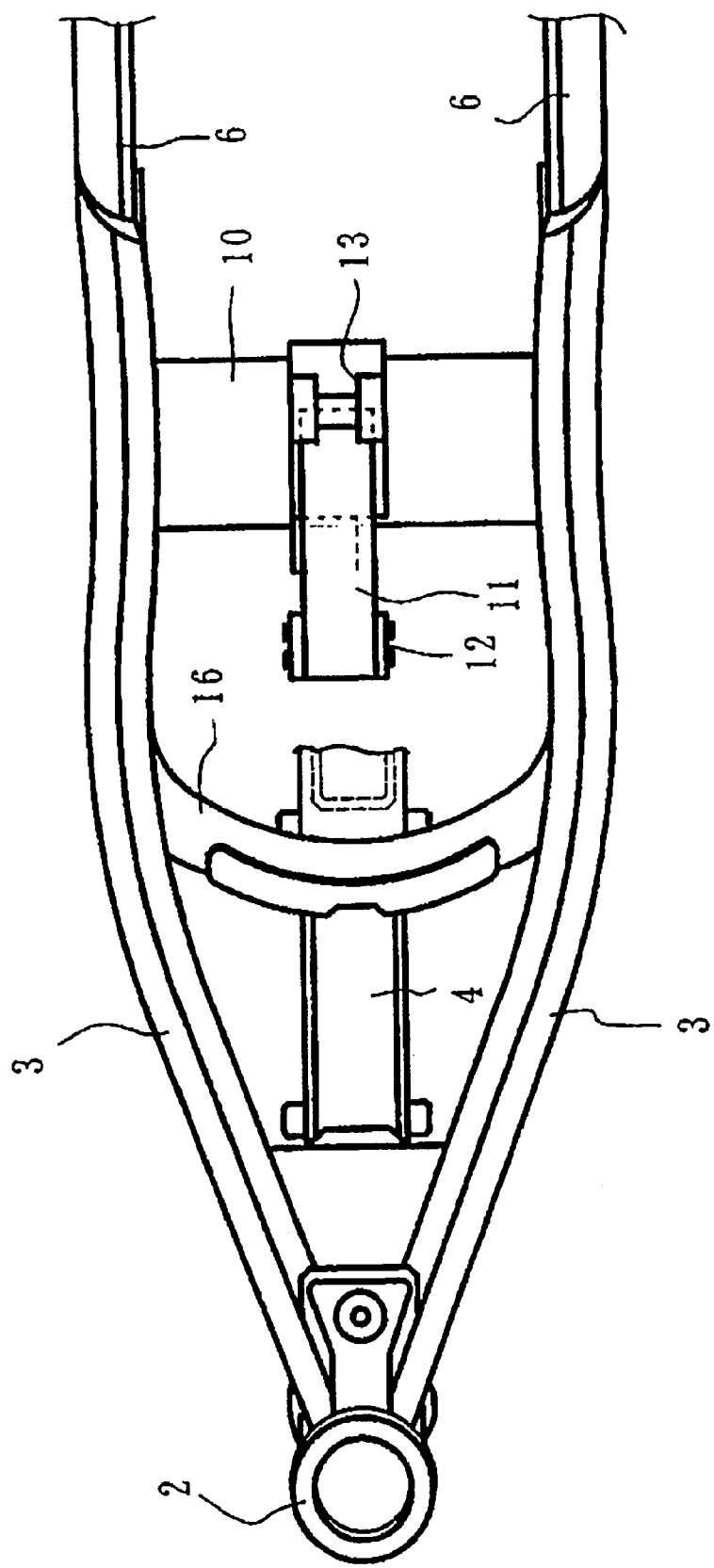
FIG. 2 is a plan view of the vehicle body frame.

As shown in FIG. 1 and FIG. 2, between the left and right main frames 3, a cross pipe 10 protrudes upwardly in an arcuate shape and is provided in a transverse direction so as to connect the main frames 3 with each other. An arm portion 11 extends from a central portion of the cross pipe in a frontward direction and approximately horizontally and the arm portion 11 has a rear end thereof welded to the cross pipe 10.

Figure 3:
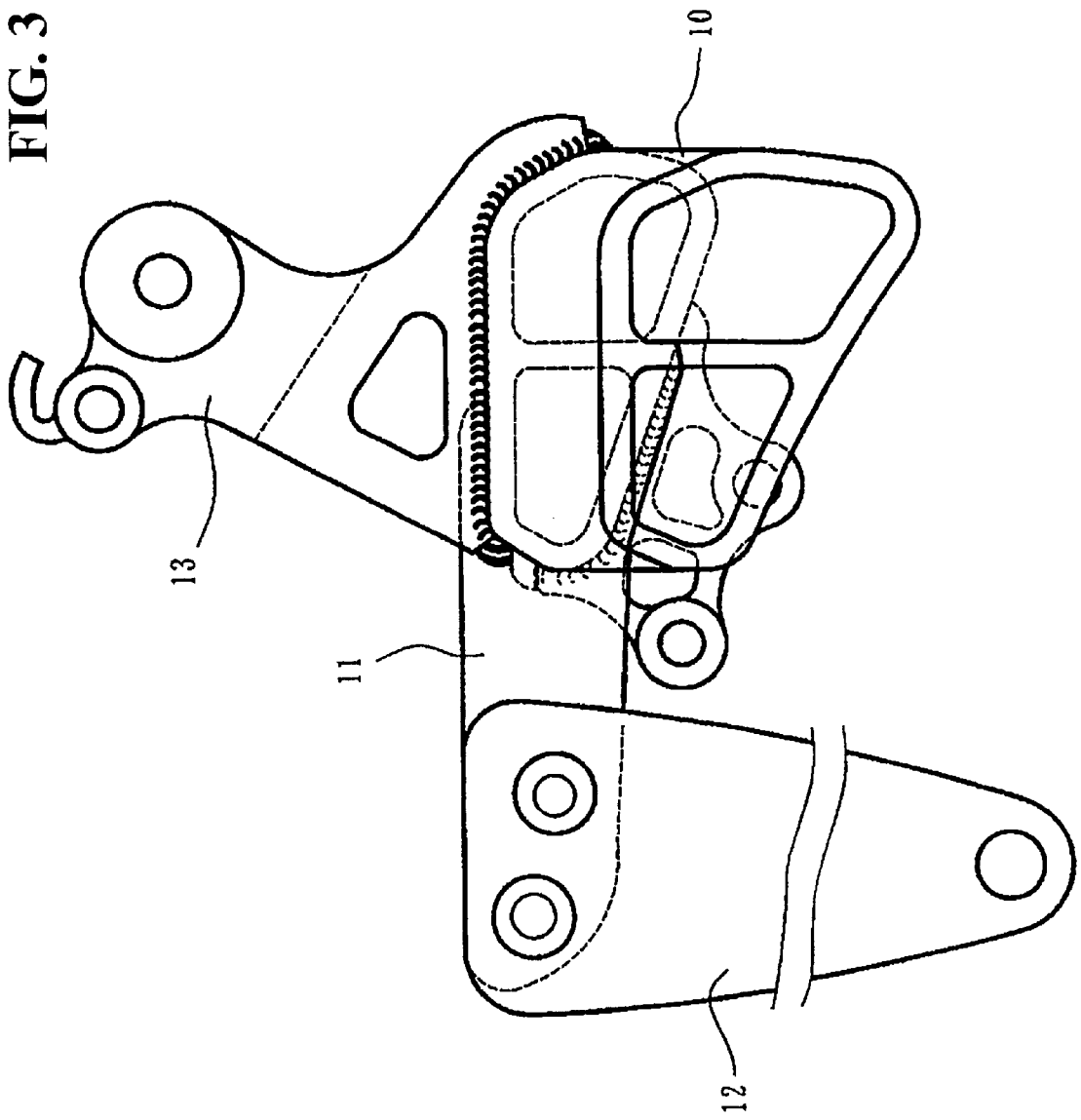
FIG. 3 is an enlarged side view of an upper engine hanger.
Figure 4:
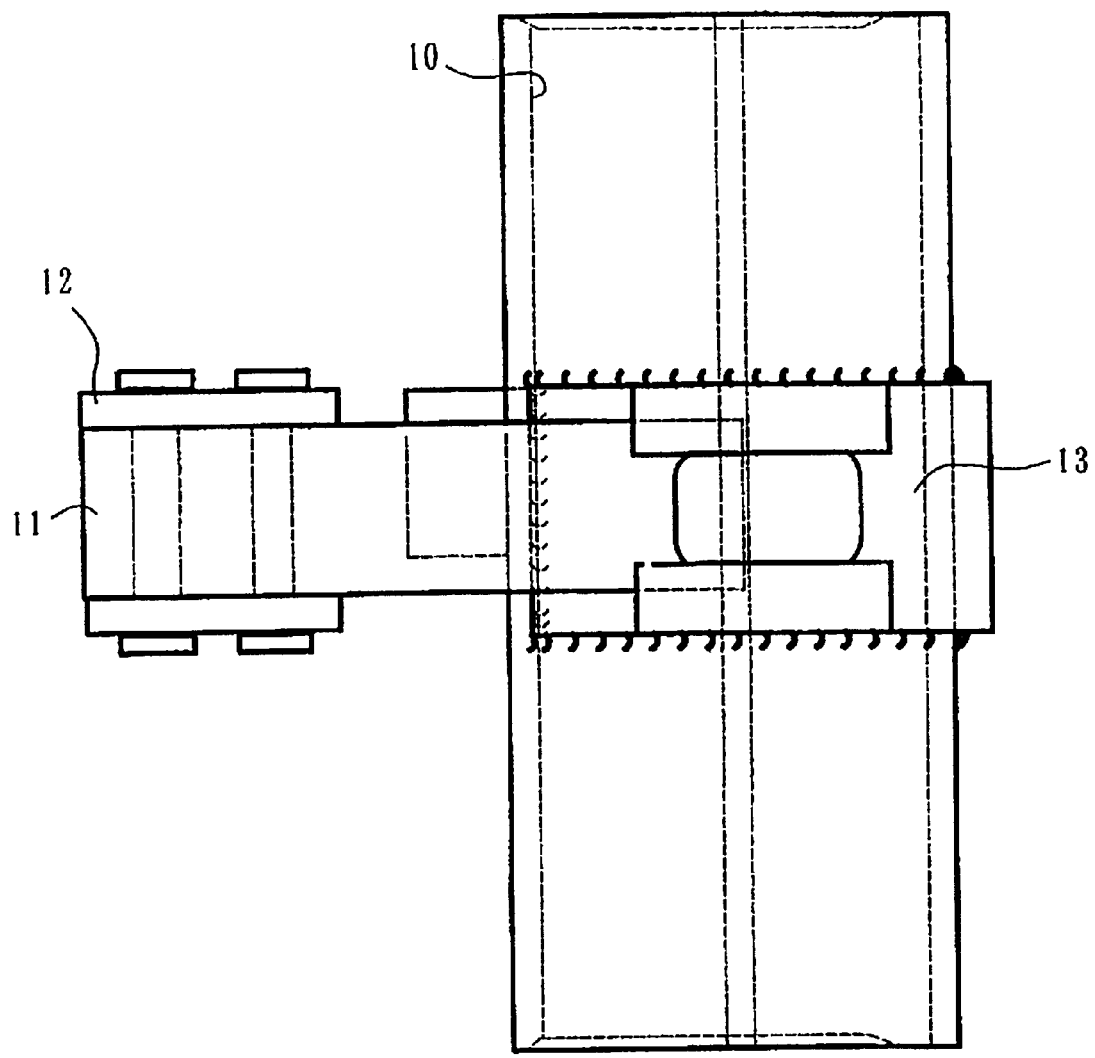
FIG. 4 is a plan view of the upper engine hanger.

As shown in FIG. 3 and FIG. 4, the arm portion 11 is formed into an elongated member having a longitudinal cross section such as a quadrangular pipe made of a suitable material such as metal or a plate by casting. An upper engine hanger 12 has an approximately triangular shape in a side view and is formed as a separate body from the arm portion 11 fixedly secured to a tip end of the arm portion 11 by means of bolts. Compared to a vertical length A of the upper engine hanger 12, a length B of the arm portion 11 can be arbitrarily adjusted to obtain a desired deflection.

The upper engine hanger 12 is integrally formed with the arm portion 11 to constitute an upper support portion for the engine. The upper engine hanger 12 is a member which extends downwardly from a frontwardly extending end of the arm portion 11 and is connected to a cylinder head portion 1a of the engine 1. The upper engine hanger 12 is formed by casting using a material equal to a material of other vehicle body frame constituting members.

The cross pipe 10 is disposed behind the cylinder head portion 1a and constitutes the largest member among the cross members provided between the left and right main frames 3. A center stay 13 is mounted on a central portion of the cross pipe 10 such that the center stay 13 protrudes upwardly. Respective tip ends of a pair of left and right seat rails 14 are connected to the center stay 13 and an upper end portion of a shock absorber 15 which constitutes a rear suspension is supported on the center stay 13.

As shown in FIG. 1 and FIG. 2, between the left and right main frames 3 and in front of the cross pipe 10, a reinforcing member 16 connecting the main frame 3 is provided in a protruding arcuate shape frontwardly in a plan view. The reinforcing member 16 has an intermediate portion thereof connected to a vertical intermediate portion of the front down tube 4.

As can be clearly understood from FIG. 1, the engine 1 is supported on the vehicle body frame not only by the above-mentioned engine hanger 12 but also by the left and right pivot plates 6, a stay 17 mounted on the front down tube 4 and a stay 18 mounted on the lower tube 5 respectively.

In FIG. 1, a pivot shaft 19, a rear fork 20, a rear wheel 21, a drive sprocket wheel 22, a chain 23 and a driven sprocket wheel 24 are provided. The pivot shaft 19 tiltably supports a front end portion of the rear fork 20 between the left and right pivot plates 6 and passes through a rear end portion of a crankcase 1b of the engine 1 so as to support the rear end portion of the crankcase 1b on the pivot plates 6.

On the other hand, the front wheel 25 is supported on a lower end of a front fork 26. The head pipe 2 rotatably supports the front fork 26 and is integrally formed with front end portions of the main frames 3 which support the upper portion of the engine 1 by way of the arm portion 1 and the upper engine hanger 12. A handle 27 is connected to an upper end portion side of the front fork 26 for steering. A fuel tank 28 and a seat 29 are mounted on the frame.

Figure 5:
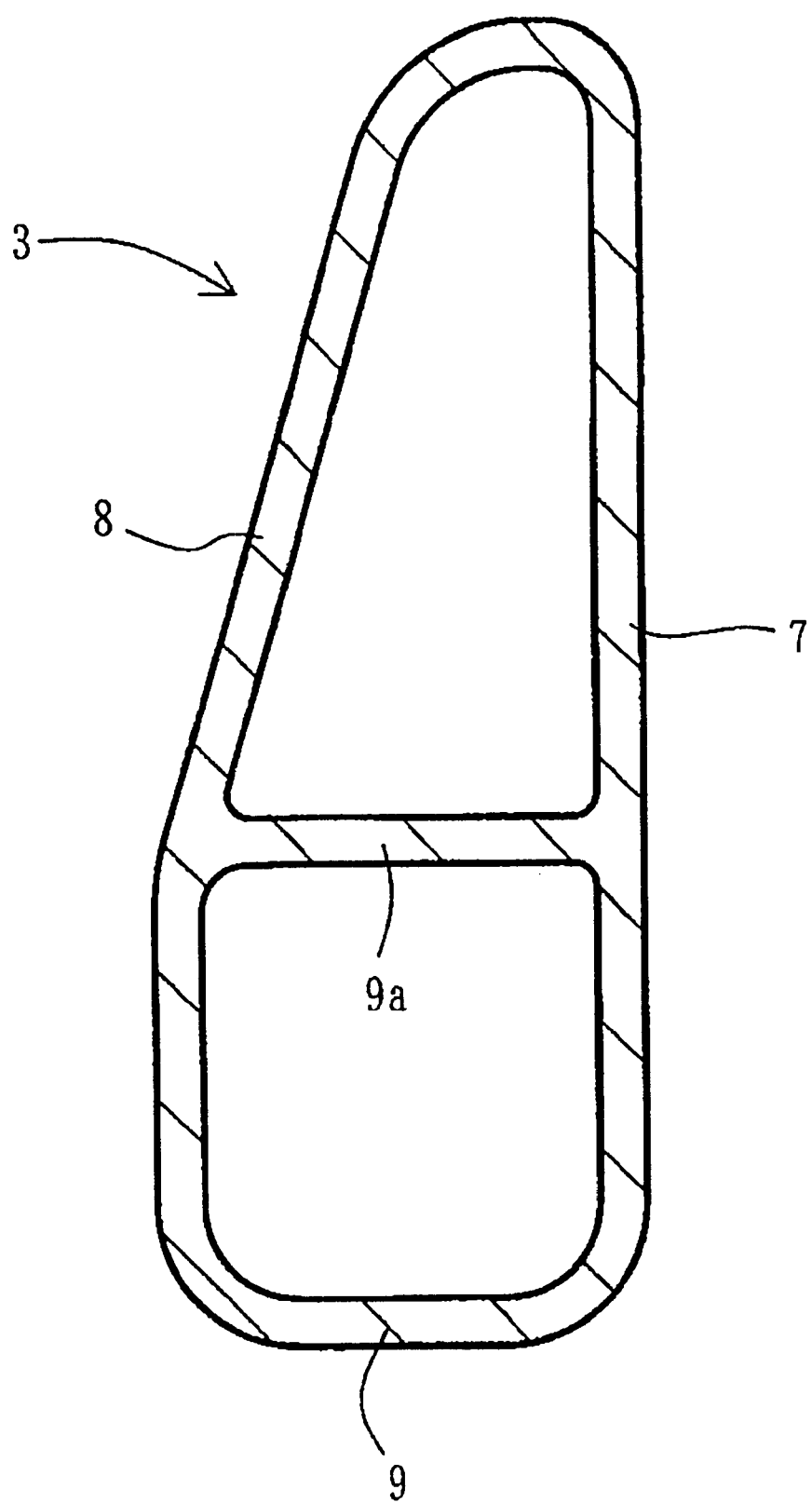
FIG. 5 is a cross-sectional view of a main frame taken along a line 5—5 in FIG. 1.

The portions which constitute the vehicle body frame are respectively manufactured using a suitable material such as an aluminum alloy or the like in a suitable manner such as casting, drawing or the like. Particularly, as shown in FIG. 5, the main frame 3 has an approximate right triangular cross section formed by drawing, wherein an inner side 7 constitutes a vertical side, an outer side 8 constitutes an inclined surface, and an intermediate reinforcing side 9a which is arranged parallel to a bottom side 9 is integrally formed with the main frame 3 at a position offset downwardly from an intermediate point in the up-down direction thus forming a cross section of deformed squarish eight shape.

Subsequently, the manner of operation of this embodiment is explained. As can be clearly understood from FIG. 1, the cylinder head 1 a of the engine 1 is supported by way of the engine hanger 12 mounted on the tip end of the arm portion 11 which extends from the cross pipe 10 in a frontward direction and approximately horizontally. Accordingly, compared with a case in which the engine hanger 12 is directly mounted on the cross pipe 10, the deflection of the engine 1 in the left-right direction becomes easy by a quantity afforded by the interposition of the arm portion 11.

Accordingly, when bending is applied to the body at the time of cornering or the like, compared with the engine 1 which is immobile to the bending, the arm portion 11 is deflected so that the body as a whole becomes more deflectable. As a result, the flexibility is added to the vehicle body frame and hence, the vehicle body frame structure suitable for meeting a specification which requires flexibility can be obtained.

Further, since the rear wheel 21 is supported on the engine 1 having a high rigidity, the supporting rigidity of the rear wheel 21 can be enhanced. Still further, contrary to the case which has been generally performed conventionally where the main frames 3 supports the engine 1 only by way of the upper engine hanger, this embodiment adopts the above-mentioned structure where the arm portion 11 is interposed between the main frames 3 and the upper engine hanger 12 and hence, the structure between the head pipe 2 which supports the front wheel 25 and the engine 1 can be easily deflected so that the flexibility suitable for actual traveling can be given to the vehicle body frame.

Besides the above, the vehicle body frame structure having such a flexibility can be realized by only providing the arm portion 11 and hence, the structure can be made relatively simple. Further, since the main frames 3 adopt an asymmetric cross section in the left-right direction as shown in FIG. 5, the vehicle body frame can have further flexibility.

Further, since the upper engine hanger 12 is formed as a separate body from the arm portion 11, it becomes easy to adjust the flexibility of the vehicle body frame by adjusting the length of the arm portion 11. Further, with the common use of respective upper engine hanger 12 and the arm portion 11 among different kinds of vehicle body frames, the generality of these components can be enhanced.

Figure 6:
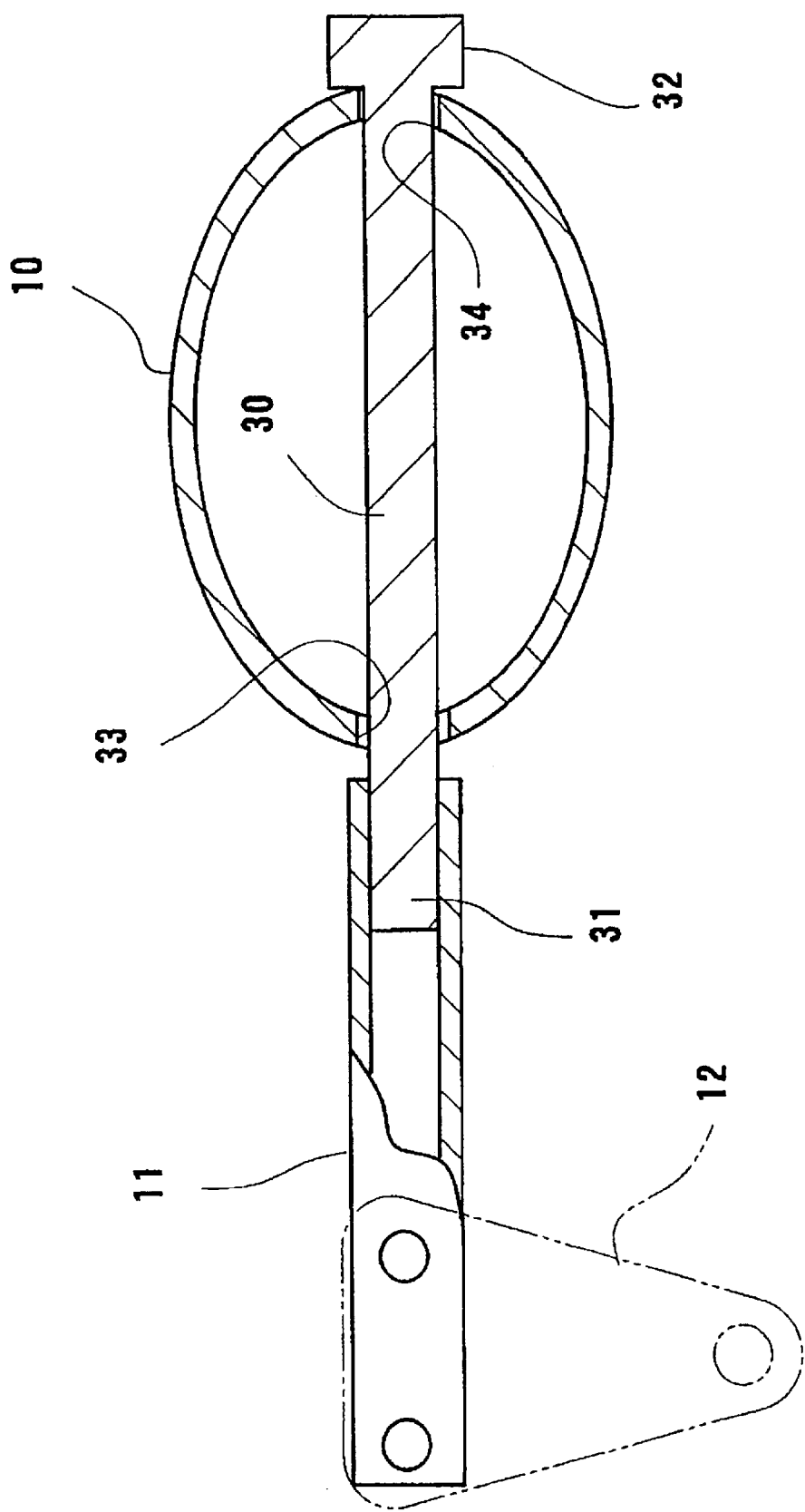
FIG. 6 is a view showing an arm mounting structure according to a second embodiment.

Subsequently, the second embodiment is explained. Since this embodiment is constituted by merely changing the previous embodiment partially, the same numerals are used to indicate parts common with the parts of the previous embodiment. Further, parts which are not referred to in the following explanation are identical with those of the previous embodiment. FIG. 6 is a schematic view showing the mounting structure of an arm portion 11 and a cross pipe 10 from a left side surface, wherein the arm portion 11 is mounted on the cross pipe 10 by way of the torsion spring 30.

The torsion spring 30 is an approximately bar-like member which is made of a known material having spring characteristics and has an arbitrary cross section. The spring constant of the torsion spring 30 can be arbitrarily determined in accordance with the specification. Further, one end (front end) 31 side of the torsion spring 30 has a dimension which allows an insertion thereof into a hollow portion of the arm portion 11 having a quadrangular pipe shape while the other end (rear end) of the torsion spring 30 is provided with an enlarged portion 32 which is larger than the one end 31 side.

On the other hand, holes which penetrate the cross pipe 10 in the front-back direction are formed in an intermediate portion of the cross pipe 10 with respect to the left-right side direction. These front and rear opening portions 33, 34 are opened at front and rear corresponding positions of the cross pipe 10. With respect to these opening portions 33 and 34, the rear opening portion 34 has a dimension which allows a general portion (portion other than the enlarged portion 32) of the torsion spring 30 to pass therethrough and is made smaller than the dimension of the enlarged portion 32. Further, the front opening portion 33 has a dimension equal to or slightly larger than the dimension of the rear opening portion 34 thus allowing the insertion of the torsion spring 30 therethrough with an area for play.

To mount the arm portion 11 to the cross pipe 10, one end 31 side of the torsion spring 30 passes through the opening portion 34 from the back of the cross pipe 10 and protrudes in the frontward direction through the opening portion 33, is fitted into the inside of the hollow portion of the arm portion 11 from the rear end side in front of the cross pipe 10, and is integrally connected with a rear end portion of the arm portion 11 by suitable means such as a bolt or the like. The enlarged portion 32 which constitutes the other end of the torsion spring 30 is also fixedly secured to the cross pipe 10 by suitable means such as welding or the like.

In such a constitution, a force in the front-back direction applied to the arm portion 11 is received by the arm portion 11 and the cross pipe 10. Since the arm portion 11 and the cross pipe 10 are indirectly connected with each other by way of the torsion spring 30, they are not directly connected with each other. Accordingly, when a force which deflects the vehicle body frame is generated at the time of cornering or the like, this force is applied to the arm portion 11 from the main frames 3 as a force which deflects the arm portion 11 in the left-right direction and, upon receiving this force, the torsion spring 30 is elastically deformed.

As a result, although the engine 1 which forms a rigid body has been a factor which interrupts the deflection in the vehicle body frame conventionally, according to the present invention, such a drawback can be eliminated with the provision of the torsion spring 30 and a smooth deflection can be given to the vehicle body frame. Further, this deflection can be arbitrarily and positively controlled by setting a spring constant of the torsion spring 30. Still further, while achieving such a favorable deflection, the influence to the left and right main frames 3 can be minimized.

Further, in the case that the upper engine hanger 12 is integrally formed with the arm portion 11 as described later or in the case that the upper engine hanger 12 per se has a high rigidity and the bonding rigidity with the arm portion 11 is high even when the upper engine hanger 12 and the arm portion 11 are formed as separate parts, the influence derived from the deflection of the upper engine hanger 12 side can be eliminated as much as possible and hence, the deflection generated by the arm portion 11 and the torsion spring 30 can be quantified whereby the control based on the determination of the spring constant of the torsion spring 30 can be performed easily.

The present invention is not limited to the above-mentioned embodiment and various modifications and applications can be made. For example, the above-mentioned upper engine hanger 12 may be integrally formed with the arm portion 11. In this case, although they are formed of a member having an approximately L-shape, an approximately V shape or an approximately chevron shape, a portion which is extends from the cross pipe 10 in the frontward direction and approximately horizontally forms the arm portion 11 and a portion which is bent downwardly at the tip end of the former portion and extends towards the upper portion of the engine 1 forms the upper engine hanger 12. In this manner, by integrally forming the upper engine hanger 12 and the arm portion 11, the number of parts can be reduced whereby the structure can be simplified. Further, the present invention is applicable not only to motorcycles of the off-road type but also to motorcycles for various applications including motorcycles of the on-road type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body frame structure for mounting an engine with an engine hanger, comprising:
   a pair of left and right main frames extending in a front-back direction above an engine;
   a cross pipe for connecting said main frames by bridging;
   an arm portion extending from said cross pipe approximately horizontally, said arm portion being a deflectable member; and
   an upper engine hanger extending downwardly for supporting an upper portion of said engine mounted on a tip end side of said arm portion,
   wherein said arm portion is a torsion spring of a predetermined length for providing a desired deflection of said arm portion, and
   wherein said cross pipe includes a first aperture at one end for receiving a first end of said torsion spring and a second aperture spaced a predetermined distance relative to the first aperture from which a distal end of said torsion spring projects outwardly therefrom, said upper engine hanger being mounted relative to said distal end.

2. The vehicle body frame structure for mounting an engine with an engine hanger according to claim 1, wherein said upper engine hanger is substantially triangular in shape for mounting one side of said upper engine hanger to said arm with a downwardly projecting portion supporting an upper portion of the engine.

3. The vehicle body frame structure for mounting an engine with an engine hanger according to claim 1, wherein said arm portion is an elongated member having a longitudinal cross section, said arm portion being of a predetermined length for providing a desired deflection.

4. The vehicle body frame structure for mounting an engine with an engine hanger according to claim 1, and further including a center stay mounted on said cross pipe for supporting a shock absorber relative thereto.

5. The vehicle body frame structure for mounting an engine with an engine hanger according to claim 4, wherein said center stay projects upwardly from said cross pipe.

6. The vehicle body frame structure for mounting an engine with an engine hanger according to claim 1, wherein said arm portion experiences deflection during cornering of the vehicle to provide flexibility relative to the vehicle body frame.

7. An engine hanger for a vehicle comprising:
   a vehicle body frame for mounting an engine relative thereto, said vehicle body frame including a pair of left and right main frames extending in a longitudinal direction relative to said vehicle body frame;
   a cross pipe for connecting said main frames by bridging;
   an arm portion extending from said cross pipe approximately horizontally, said arm portion being a deflectable member; and an upper engine hanger extending downwardly for supporting an upper portion of an engine mounted on a tip end side of said arm portion, wherein said arm portion is a torsion spring of a predetermined length for providing a desired deflection of said arm portion, and wherein said cross pipe includes a first aperture at one end for receiving a first end of said torsion spring and a second aperture spaced a predetermined distance relative to the first aperture from which a distal end of said torsion spring projects outwardly therefrom, said upper engine hanger being mounted relative to said distal end.

8. The engine hanger according to claim 7, wherein said upper engine hanger is substantially triangular in shape for mounting one side of said upper engine hanger to said arm with a downwardly projecting portion supporting an upper portion of the engine.

9. The engine hanger according to claim 7, wherein said arm portion is an elongated member having a longitudinal cross section, said arm portion being of a predetermined length for providing a desired deflection.

10. The engine hanger according to claim 7, and further including a center stay mounted on said cross pipe for supporting a shock absorber relative thereto.

11. The engine hanger according to claim 10, wherein said center stay projects upwardly from said cross pipe.

12. The engine hanger according to claim 7, wherein said arm portion experiences deflection during cornering of the vehicle to provide flexibility relative to the vehicle body frame.

13. A vehicle body frame structure for mounting an engine with an engine hanger, comprising:

a pair of left and right main frames extending in a front-back direction above an engine;

a cross pipe for connecting said main frames by bridging;

an arm portion extending from said cross pipe approximately horizontally;

an upper engine hanger extending downwardly for supporting an upper portion of said engine mounted on a tip end side of said arm portion; and a rear fork being rotatably supported by said main frames and said engine, wherein said arm portion is a torsion spring of a predetermined length for providing a desired deflection of said arm portion, and wherein said cross pipe includes a first aperture at one end for receiving a first end of said torsion spring and a second aperture spaced a predetermined distance relative to the first aperture from which a distal end of said torsion spring projects outwardly therefrom, said upper engine hanger being mounted relative to said distal end.

14. The vehicle body frame structure for mounting an engine with an engine hanger according to claim 13, wherein said arm portion experiences deflection during cornering of the vehicle to provide flexibility relative to the vehicle body frame.

* * * * *